United States Patent [19]

Inoue

[11] 4,052,583

[45] Oct. 4, 1977

[54] METHOD OF AND APPARATUS FOR ELECTRICAL-DISCHARGE MACHINING WITH A TRAVELING-WIRE ELECTRODE

[75] Inventor: Kiyoshi Inoue, Tokyo, Japan

[73] Assignee: Inoue-Japax Research Incorporated, Yokohamashi, Japan

[21] Appl. No.: 699,206

[22] Filed: June 23, 1976

[30] Foreign Application Priority Data

June 24, 1975 Japan .............................. 50-78825

[51] Int. Cl.² ................................................ B23P 1/08
[52] U.S. Cl. ................................. 219/69 W; 219/69 M
[58] Field of Search ................ 219/69 W, 69 M, 69 C, 219/69 R; 235/151.11; 324/71 R, 71 E

[56] References Cited

U.S. PATENT DOCUMENTS

| | | | |
|---|---|---|---|
| 2,856,582 | 10/1958 | Anderson | 324/71 R |
| 3,731,045 | 5/1973 | Ullmann et al. | 219/69 W |
| 3,749,877 | 7/1973 | Lobur | 219/69 C |
| 3,997,753 | 12/1976 | Inoue | 219/69 C |

Primary Examiner—Bruce A. Reynolds
Attorney, Agent, or Firm—Karl F. Ross

[57] ABSTRACT

The relative movement of a workpiece and a traveling-wire electrode in an electrical-discharge machining apparatus is interrupted temporarily while the application of the usual electrical pulses for effecting machining is continued until and after discharge substantially ceases. The leakage current is then measured to provide an indication of workpiece thickness. This indication is used to control a machining parameter, whereupon the relative movement and machining with the new parameter, are resumed.

11 Claims, 3 Drawing Figures

METHOD OF AND APPARATUS FOR ELECTRICAL-DISCHARGE MACHINING WITH A TRAVELING-WIRE ELECTRODE

FIELD OF THE INVENTION

The present invention relates to electrical-discharge machining and, more particularly, to a method of and an apparatus for electrical-discharge machining utilizing a wire or like elongated electrode caused to travel through a machining zone and a workpiece displaced relatively thereto and transversely to the direction of travel of the wire.

BACKGROUND OF THE INVENTION

In electrical-discharge machining of this type, the wire or like elongated electrode, which will hereinafter be referred to as "wire electrode", is held under tension and displaced to travel through a machining zone flushed with a machining liquid which is usually distilled water and a series of electric pulses are applied across the machining gap between the wire electrode and the workpiece to effect time-spaced electrical-discharges between them to remove material from the workpiece.

The transverse displacement of the workpiece relative to the travelling-wire electrode to follow the material removal is usually effected automatically by a control system under programmed instructions which define a predetermined cutting path.

I have now found that in order to achieve better machining accuracy and efficiency and stability of operation, compensation for the machining zone or workpiece thickness is essential.

In prior practice, the wire electrode has been passed through the machining zone at a constant speed and machining pulses of a constant pulse duration, interval and peak current have been utilized throughout a given machining operation. As a consequence, with change in the thickness of the workpiece, a change is brought about in the amount of the wire electrode wear, this local wear variation limiting the machining accuracy attainable and rendering the operation unstable. It can also be a cause of the rupture of the wire electrode.

OBJECTS OF THE INVENTION

It is therefore an important object of the present invention to provide an improved method of and apparatus for electrical-discharge machining with a travelling-wire electrode whereby the aforementioned conventional disadvantages can be overcome.

Another object of the present invention is to provide an improved method of electrical discharge machining of the type described in which the thickness of the workpiece is effectively ascertained and measured and can be compensated for.

A further object of the present invention is to provide an improved apparatus for carrying out the method.

SUMMARY OF THE INVENTION

Electrical-discharge machining is carried out with a wire electrode displaced to travel through a machining zone in which a workpiece is displaced relative to the travelling-wire electrode and transversely to the direction of the travel of the wire electrode. A machining liquid is supplied to the machining gap formed between the workpiece and the travelling-wire electrode, and a series of electric pulses are applied across the machining gap to effect electrical-discharges between the workpiece and the travelling-wire electrode through the machining liquid to remove material from the workpiece. The relative displacement between the workpiece and the travelling-wire electrode is effected along a predetermined machining path.

According to the invention the thickness of the workpiece being machined is ascertained by temporarily halting the relative displacement to permit electrical discharges to be diminished and substantially disappear while electric pulses continue to be applied across the machining gap. I then measure the leakage current passing through the machining gap and derive the thickness of the workpiece from the measured leakage current.

In accordance with a feature of the invention, the ascertained thickness of the workpiece is utilized to establish a particular value of a machining parameter which is preset corresponding to said particular thickness of the workpiece and the relative displacement between the workpiece and the travelling-wire electrode is resumed to restore the electrical-discharge machining with the new value of machining parameter.

An apparatus according to the present invention includes the conventional means for causing a wire electrode to travel through a machining zone, means for displacing a workpiece relative to the travelling-wire electrode and transversely to the direction of the travel of the wire electrode along a predetermined machining path, means for supplying a machining liquid to a machining gap between the workpiece and the travelling-wire electrode, and means for applying a series of electric pulse across the machining gap to effect electrical-discharges between the workpiece and the travelling-wire electrode through the machining liquid to remove material from the workpiece.

The improvement of this invention comprises:

Means for temporarily halting said relative displacement to permit electrical discharges to be diminished and eventually disappear in the machining gap while electric pulses continue to be applied across the machining gap;

means for detecting the substantial disappearnace of the electrical discharge; and means responsive to the detecting means for measuring the leakage current passing through the machining gap during the disappearance of the electrical discharges and deriving the thickness of the workpiece being machined from the measured leakage current.

The apparatus can further include:

Means for establishing a particular value of a machining parameter preset to correspond to each particular thickness of the workpiece, and means for resuming the relative displacement between the workpiece and the travelling-wire electrode to restore the electrical-discharge machining with the particular value of the machining parameter established.

BRIEF DESCRIPTION OF THE DRAWING

These and other objects, features and advantages of the invention will become more readily apparent from the following description, reference being made to the accompanying drawing in which.

SPECIFIC DESCRIPTION AND EXAMPLE

Figure 1:
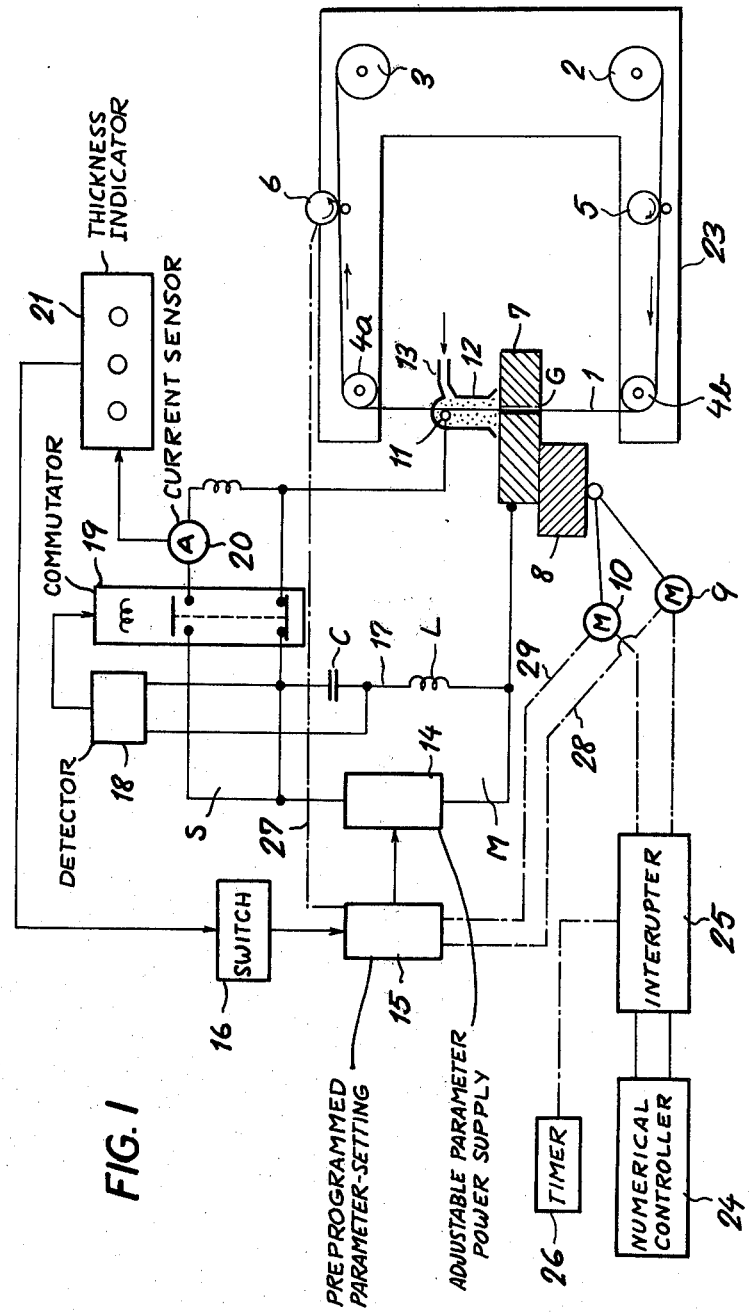
FIG. 1 is a diagrammatic representation of one embodiment of the invention.

Referring now to FIG. 1, a wire electrode 1 is shown continuously fed from a supply reel 2 and wound onto a take-up reel 3, the wire being stretched over and between guide supports 4a and 4b under the action of a drive roller 6 provided on the take-up side and a brake roller 5 provided on the supply side to maintain a predetermined tension in the wire.

Shown at 7 is a workpiece securely mounted on a table 8 disposed between the guide supports 4a and 4b (carried by the electrode frame 23) in machining relationship to the travelling-wire electrode 1. The table 8 supporting the workpiece 7 is displaced in an x-y plane by means of an x-axis drive unit 9 and a y-axis drive unit 10 (shown diagrammatically which are operated by signals supplied from a conventional copying device, numerical control unit (e.g.,24) or any other control system (not shown) in accordance with programmed instructions defining a predetermined machining path of the workpiece 7.

A conductor 11 is held in contact with the wire electrode 1 to connect the same to one pole of a power supply and is shown to be disposed within a guide chamber 12 for a machining liquid enclosing the portion of the wire electrode 1 extending between the conductor 11 and the machining zone of the workpiece 7.

The machining liquid, which is usually distilled water, is introduced into the guiding chamber 12 through a nozzle 13 by a pump unit (not shown).

Shown at 14 is the power supply connected to the conductor 11 and the workpiece 7, having its output parameters such as pulse duration, interval and peak current each or in a combination controllable by a setting unit 15 operated by a switching unit 16.

Connected also across the machining gap G between the workpiece 7 and the electrode 1 is a resonant circuit 17 comprising an inductor L and capacitor C responsive to the presence or absence of discharge occurrences in the machining gap, the oscillations of the resonant circuit being detected by a detector circuit 18 which in turn controls a commutator or relay 19.

In the shunt circuit S of the power supply 14 connecting to the machining gap G, there is provided a current sensor 20, which may comprise a direct current ammeter, for measuring a leakage current through the machining gap. The current sensor 20 is connected to an indicator 21 which is responsive thereto and adapted to indicate the thickness of the workpiece 7 corresponding to the measured current and also adapted to act upon the switching unit 16.

In operation, while the wire electrode 1 is being continuously passed through the machining zone flushed with the machining liquid supplied from the nozzle 13, a series of machining pulses are applied across the machining gap G between the wire electrode 1 and the workpiece 7 to effect electrical discharges removing the material from the workpiece 7 and the latter is displaced relative to the travelling-wire electrode by motors 9 and 10 controlledly driven by the control equipment in accordance with the predetermined, programmed machining path information signals.

In accordance with the present invention, the operation of the motors 9 and 10 is temporarily halted, e.g., by the operation of interrupter or relay 25 which can be triggered periodically by a timer 26. Afer the halting, discharges initially occur regularly but their repetition rate decreases eventually to nil as the machining gap G is broadened with material removal from the workpiece 7. These conditions, the state at the moment of halting the machining feed and that after the termination of discharges are diagrammatically shown in FIGS. 2(a) and 2(b), respectively.

Figure 2A:
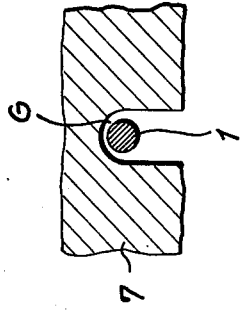
FIG. 2(a) diagrammatically illustrates in cross section the state at which the relative displacement between the workpiece and the travelling-wire electrode has just been halted.

In the state of FIG. 2(a), the resonant circuit 17 responds to the high-frequency components of discharges and the resonating voltage is detected thereby.

Figure 2B:
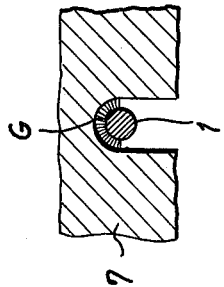
FIG. 2(b) diagrammatically illustrates in cross section the state in which the production of electrical discharge ceases and only a leakage current flows between the workpiece and the travelling-wire electrode.

In the state of FIG. 2(b), however, the resonating voltage decreases eventually to nil and the absence of this voltage is detected by the detector circuit 18. The detector circuit 18 actuates the commutator 19 to separate the main power circuit M from the machining gap G and connect the shunt circuit S to the machining gap G to make the current sensor 20 operative therein and responsive to the leakage current passing through the machining liquid from the power source 14 in the absence of discharges.

By the measurement of this leakage current, the thickness of the workpiece is obtained. For example, with the pulse voltage V applied from the source 14 being 200 volts, the diameter w of the wire electrode 1 being 0.2 mm, the specific resistivity r of the machining liquid (distilled water) being $5 \times 10^4$ ohm-cm, the spacing g of the machining gap G in the state of FIG. 2(b) being 0.012 mm and the leakage current detected I being 0.1 ampere, one can obtain the thickness t of the workpiece 7 as follows:

$$t = \frac{r \times g}{V} \times \frac{I}{\pi \left( \frac{W}{2} + g \right)}$$

$$t = \frac{5 \times 10^4 \times 0.012 \times 10^{-1}}{200} \times \frac{0.1}{0.3 \times 10^{-1}} \doteq 1 \text{ cm}$$

The machining gap spacing at which a discharge is incapable of taking place is proportional to the applied voltage and since this voltage, the specific resistivity of the machining liquid and the diameter of the wire electrode can all be fixed, the thickness of the workpiece can be determined in proportion to the detected leakage current and is displaced at the indicator 21. As already noted, the indicator 21 has the additional function of acting on the switching unit 16 so that optimum values of the pulse parameters are automatically selected by the setting unit 15 and established in the power pulse supply 14 in accordance with the thickness of the workpiece 7 detected. When the optimum setting is completed, a setting completion signal is generated by the setting unit 15 and applied to the commutator 19 so that the electrical-discharge machining is resumed automatically and proceeds in the machining gap with the optimized pulse parameters.

Optimum values of pulse parameters, i.e., pulse duration ($\tau$on), pulse interval ($\tau$off) and pulse peak current ($I_p$) for different thicknesses of the workpiece can be obtained from experimental date and empirical formulae, for example, as follows:

| t(mm) | $\tau$on($\mu$sec) | $\tau$off($\mu$sec) | $I_p$(A) |
|---|---|---|---|
| 1 | 10 | 8 | 8 |
| 10 | 12 | 10 | 14 |
| 20 | 12 | 12 | 22 |

-continued

| t(mm) | τon(μsec) | τoff(μsec) | I_p(A) |
|---|---|---|---|
| 40 | 12 | 10 | 26 |
| 50 | 12 | 10 | 30 |
| 60 | 12 | 10 | 30 |
| 80 | 12 | 10 | 30 | which apply to machining of steel workpieces.

These numerical data may be stored in a programming unit in the setting unit 15 which may comprise a read-only memory, micro-computer or the like having memory and processing functions and a selection is made by the switching unit 16 which may comprise digital switches.

It should be noted that the machining parameter which may be controlled according to the present invention is not limited to the pulse parameters described but in addition thereto or alternative thereof the travelling speed of the wire electrode can be controlled as represented by line 27. The control of the travelling speed of the wire electrode is such that it is increased and decreased with increase and decrease in the thickness of the workpiece. The speed of the relative displacement between the workpiece and the travelling-wire electrode can also be controlled (as represented by lines 28 and 29) as a function of the thickness of the workpiece to achieve a maximum removal rate and stability of operation.

I claim:

1. In a method of electrically machining a conductive workpiece in which:
   a traveling-wire electrode and the workpiece are relatively displaced transversely to the length of the traveling-wire electrode and define a machining gap between them,
   a machining liquid is supplied to said gap, and
   a series of electrical pulses are applied across the workpiece and the electrode to generate machining discharges in the gap to remove material from the workpiece, the improvement which comprises:
   a. temporarily interrupting said relative displacement of said electrode and said workpiece;
   b. continuing the application of said pulses during the interruption until the discharges across the gap substantially cease; and
   c. when said discharges across the gap substantially cease, measuring the leakage current across said gap for at least one further applied pulse, said leakage current providing an indication of workpiece thickness.

2. The improvement defined in claim 1 wherein the machining has parameters of pulse duration, interpulse interval, pulse current, speed of said relative displacement and speed of said traveling-wire electrode, at least one of which is adjustable, said method further comprising:
   d. controlling an adjustable one of said parameters in dependence upon the indicated workpiece thickness; and
   e. resuming said relative displacement and the machining of said workpiece with the adjustable parameter as thus controlled.

3. The improvement defined in claim 2 wherein the adjustable parameter is the pulse duration.

4. The improvement defined in claim 2 wherein said adjustable parameter is the interpulse interval.

5. The improvement defined in claim 2 wherein the adjustable parameter is the pulse current.

6. The improvement defined in claim 2 wherein the adjustable parameter is a combination of the pulse duration, the interpulse interval and the peak current of the electrical pulses.

7. The improvement defined in claim 2 wherein said parameter is the speed of the traveling-wire electrode.

8. The improvement defined in claim 2 wherein the adjustable parameter is the speed of said relative displacement.

9. In an apparatus for the electrical machining of a conductive workpiece including:
   a traveling-wire electrode,
   means for relatively displacing said traveling-wire electrode and a workpiece in accordance with a predetermined program while maintaining a machining gap therebetween,
   means for supplying a machining liquid to said gap, and
   means for applying electrical pulses across said workpiece and said electrode to effect material-removal machining discharges across said gap, the improvement which comprises:
   a. means for temporarily halting said relative displacement while permitting continued application of said pulses; and
   b. means effective to the substantial termination of said discharges for measuring leakage current across said gap upon application of at least one further electrical pulse, the magnitude of said leakage current being an indication of the thickness of said workpiece.

10. The improvement defined in claim 9, further comprising means responsive to the indication of workpiece thickness for controlling a parameter of the machining.

11. The improvement defined in claim 9 wherein said means effective upon substantial termination of said discharges includes detector means responsive to oscillations in circuit with said gap, and current-sensing means operated by said detecting means for measuring said leakage current.

* * * * *